United States Patent
Aoki et al.

(10) Patent No.: US 6,737,863 B2
(45) Date of Patent: May 18, 2004

(54) ROTATION DETECTING DEVICE AND METHOD OF PRODUCING SAME

(75) Inventors: Yuhide Aoki, Gunma (JP); Shinji Akiyama, Gunma (JP)

(73) Assignee: Unisia Jecs Corporation, Kanagawa (JP)

( * ) Notice: Subject to any disclaimer, the term of this patent is extended or adjusted under 35 U.S.C. 154(b) by 25 days.

(21) Appl. No.: 10/153,725

(22) Filed: May 24, 2002

(65) Prior Publication Data

US 2002/0180424 A1 Dec. 5, 2002

(30) Foreign Application Priority Data

May 30, 2001 (JP) ........................... 2001-163413

(51) Int. Cl.[7] .............. G01B 7/30; G01P 1/02
(52) U.S. Cl. ............... 324/207.25; 324/173; 29/841
(58) Field of Search ............. 324/174, 207.16, 324/207.2, 207.21, 291, 292; 29/602.1, 595, 841; 174/52.1, 52.2; 73/493, 494

(56) References Cited

U.S. PATENT DOCUMENTS

| | | | | |
|---|---|---|---|---|
| 4,994,739 A | * | 2/1991 | Honda et al. | 324/207.14 |
| 5,488,294 A | * | 1/1996 | Liddell et al. | 324/207.21 |
| 5,631,557 A | * | 5/1997 | Davidson | 324/174 |
| 5,963,028 A | * | 10/1999 | Engel et al. | 324/207.2 |
| 6,157,186 A | | 12/2000 | Aoki et al. | |
| 6,326,779 B1 | * | 12/2001 | Shinjo et al. | 324/207.21 |
| 6,427,316 B1 | * | 8/2002 | Shinjo et al. | 29/602.1 |
| 6,534,994 B1 | * | 3/2003 | Doderer et al. | 324/500 |
| 6,593,732 B2 | * | 7/2003 | Dammkohler et al. | 324/207.21 |

FOREIGN PATENT DOCUMENTS

| | | |
|---|---|---|
| JP | 11-14644 | 1/1999 |
| JP | 2000-180460 | 6/2000 |

\* cited by examiner

Primary Examiner—N. Le
Assistant Examiner—Reena Aurora
(74) Attorney, Agent, or Firm—Sughrue Mion, PLLC

(57) ABSTRACT

A rotation detecting device has the following structure. An intermediate assembly includes terminal pins having projections at given portions thereof; a molded plastic base in which the given portions of the terminal pins are embedded with the projections being exposed to the outside; and a plurality of electronic elements connected to the exposed projections of the given portions of the terminal pins. One of the electronic elements is a sensor element which is mounted on the molded plastic base. A molded plastic housing entirely and hermetically covers the intermediate assembly except a connector part thereof where leading ends of the terminal pins are positioned. For producing the rotation detecting device, two or three molding assemblies are used in order.

14 Claims, 13 Drawing Sheets

# ROTATION DETECTING DEVICE AND METHOD OF PRODUCING SAME

BACKGROUND OF INVENTION

1. Field of Invention

The present invention relates in general to a detector and a method of producing same and more particularly to a rotation detecting device that detects a rotation speed of a rotation member and a method of producing same.

2. Description of Related Art

Hitherto, as rotation detecting devices, optical and magnetic types have been widely used because these types can detect a rotation speed of a rotation member without contacting the same.

Laid-open Japanese Patent Application (Tokkai) 2000-180460 shows a magnetic type rotation detecting device that detects rotation speed of an automotive road wheel. In the device of this publication, there is used a substrate of insulated plastic material for mounting thereon a given wiring pattern. The plastic material has glass fibers embedded therein for a reliable durability of the substrate. To the substrate, there are further connected through soldering various electronic elements, such as, a magnetic resistance element, Hall element and the like for a sensor. The substrate thus mounting thereon the various electronic elements is installed in a metal case which is fixed to a housing of plastic material.

Laid-open Japanese Patent Application (Tokkai-hei) 11-14644 shows, as is seen from FIGS. 12 and 13 of the accompanying drawings, a substrate 52 (see FIG. 13) which is received in a recess 50A formed in a housing 50 of plastic material. As is seen from FIG. 12, a plastic sealing material 54 is packed in recess 50A to hermetically install substrate 52 in recess 50A. The housing 50 has a connector part 56 integrally molded therewith with terminal pins 56A (only one is shown) as inserts. For assembling the parts, substrate 52 is set in the recess 50A, then, terminal pins 56A are soldered to given portions of a wiring pattern on substrate 52, and then, plastic sealing material 54 is packed in recess 50A.

SUMMARY OF INVENTION

However, the rotation detecting devices of the above-mentioned publications have failed to provide users with satisfaction. Specifically, due to inherent constructions, production of the devices needs a complicated assembling process which thus brings about increase in cost of the devices.

It is therefore an object of the present invention to provide a rotation detecting device which is easily produced and assembled.

It is another object of the present invention to provide a method of producing the rotation detecting device with ease.

According to a first aspect of the present invention, there is provided a rotation detecting device which comprises an intermediate assembly including terminal pins having given portions, each given portion having at least one projection; a molded plastic base in which the given portions of the terminal pins are embedded with the projections being exposed to the outside; and a plurality of electronic elements connected to the exposed projections of the given portions of the terminal pins, one of the electronic elements being a sensor element which is mounted on the molded plastic base; and a molded plastic housing entirely and hermetically covering the intermediate assembly except a connector part thereof where leading ends of the terminal pins are positioned.

According to a second aspect of the present invention, there is provided a method of producing a rotation detecting device, which comprises (a) setting a plurality of terminal pins in a first mold assembly, the terminal pins having projections; (b) injecting a molten plastic material into the first mold assembly to produce a parts-holder, the parts-holder including a molded plastic base in which given portions of the terminal pins are embedded with the projections being exposed to the outside; (c) connecting electronic elements to the exposed projections of the terminal pins thereby to constitute an intermediate assembly; and (d) molding a housing that hermetically embeds therein the intermediate assembly except leading ends of the terminal pins and has a recess of a connector part to which the leading ends of the terminal pins are exposed.

According to a third aspect of the present invention, there is provided a method of producing a rotation detecting device, which comprises (a) setting a plurality of terminal pins in a first mold assembly, the terminal pins having projections; (b) injecting a molten plastic material into the first mold assembly to produce a parts-holder, the parts-holder including a molded plastic base in which given portions of the terminal pins are embedded with the projections being exposed to the outside; (c) connecting electronic elements to the exposed projections of the terminal pins thereby to constitute an intermediate assembly, the connecting being achieved by one of soldering technique and welding technique; (d) setting the intermediate assembly in a second mold assembly; and (e) injecting a molten plastic material into the second mold assembly to mold a housing that hermetically embeds therein the intermediate assembly except leading ends of the terminal pins and has a recess of a connector part to which the leading ends of the terminal pins are exposed.

According to a fourth aspect of the present invention, there is provided a method of producing a rotation detecting device, which comprises (a) setting a plurality of terminal pins in a first mold assembly, the terminal pins having projections; (b) injecting a molten plastic material into the first mold assembly to produce a parts-holder, the parts-holder including a molded plastic base in which given portions of the terminal pins are embedded with the projections being exposed to the outside; (c) connecting electronic elements to the exposed projections of the terminal pins thereby to constitute a first intermediate assembly, the connecting being achieved by one of soldering technique and welding technique; (d) setting the first intermediate assembly in a second mold assembly; (e) injecting a molten plastic material into the second mold assembly to mold a first housing part that hermetically embeds therein the first intermediate assembly except leading portions of the terminal pins, thereby to produce a second intermediate assembly; (f) setting the second intermediate assembly in a third mold assembly; and (g) injecting a molten plastic material into the third mold assembly to mold a second housing part that hermetically covers one portion of the second intermediate assembly and has a recess of a connector part to which leading ends of the terminal pins are exposed.

Other objects of the present invention will become apparent from the following description when taken in conjunction with the accompanying drawings.

DETAILED DESCRIPTION OF EMBODIMENTS

Figure 1:
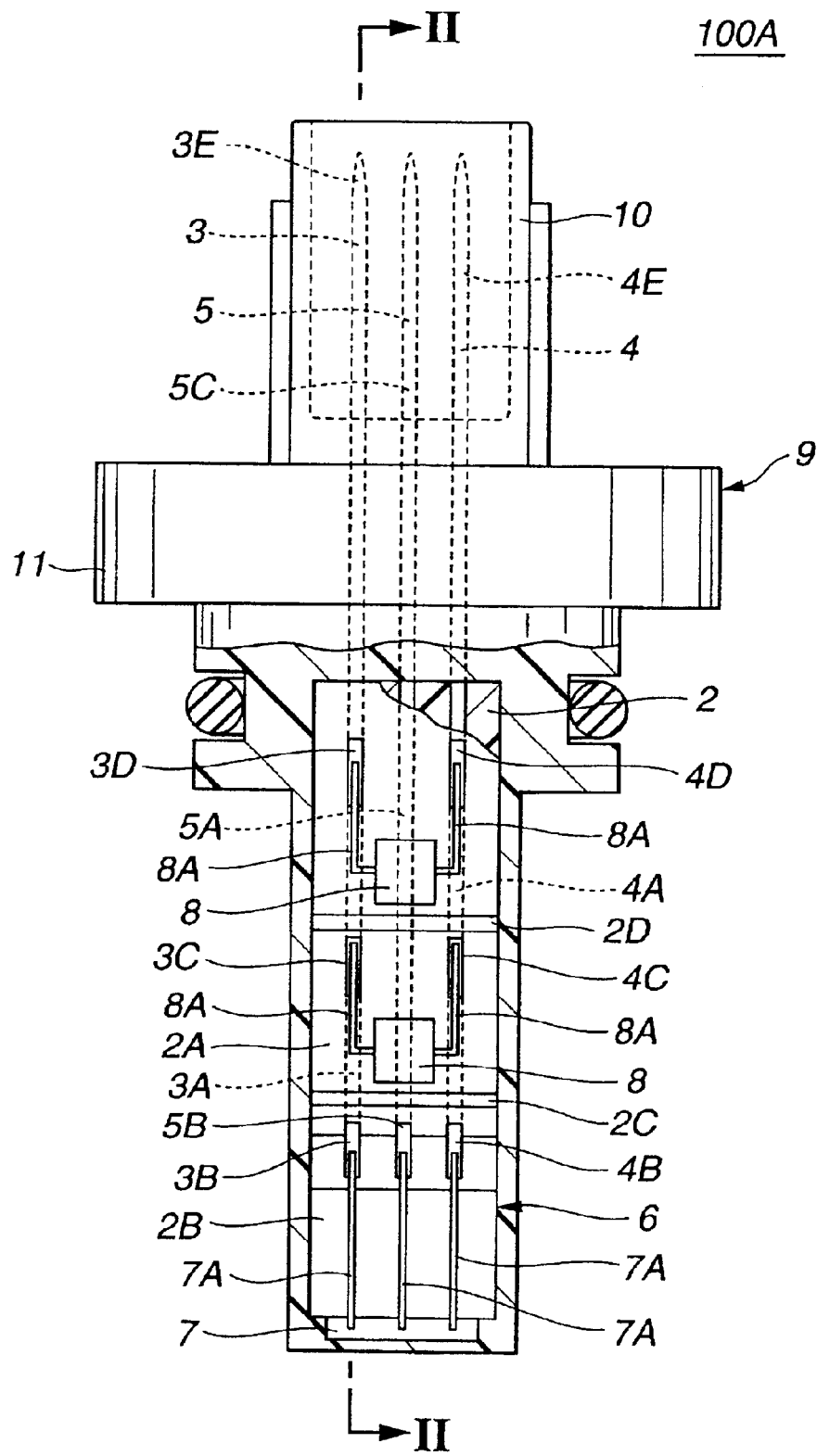
FIG. 1 is a sectional view of a rotation detecting device of a first embodiment of the present invention.

In the following, embodiments of the present invention will be described in detail with the aid of the accompanying drawings.

For ease of understanding, various directional terms, such as right, left, upper, lower, rightward, etc., are used in the description. However, such terms are to be understood with respect to the drawing or drawings on which a corresponding part or portion is shown.

Figure 2:
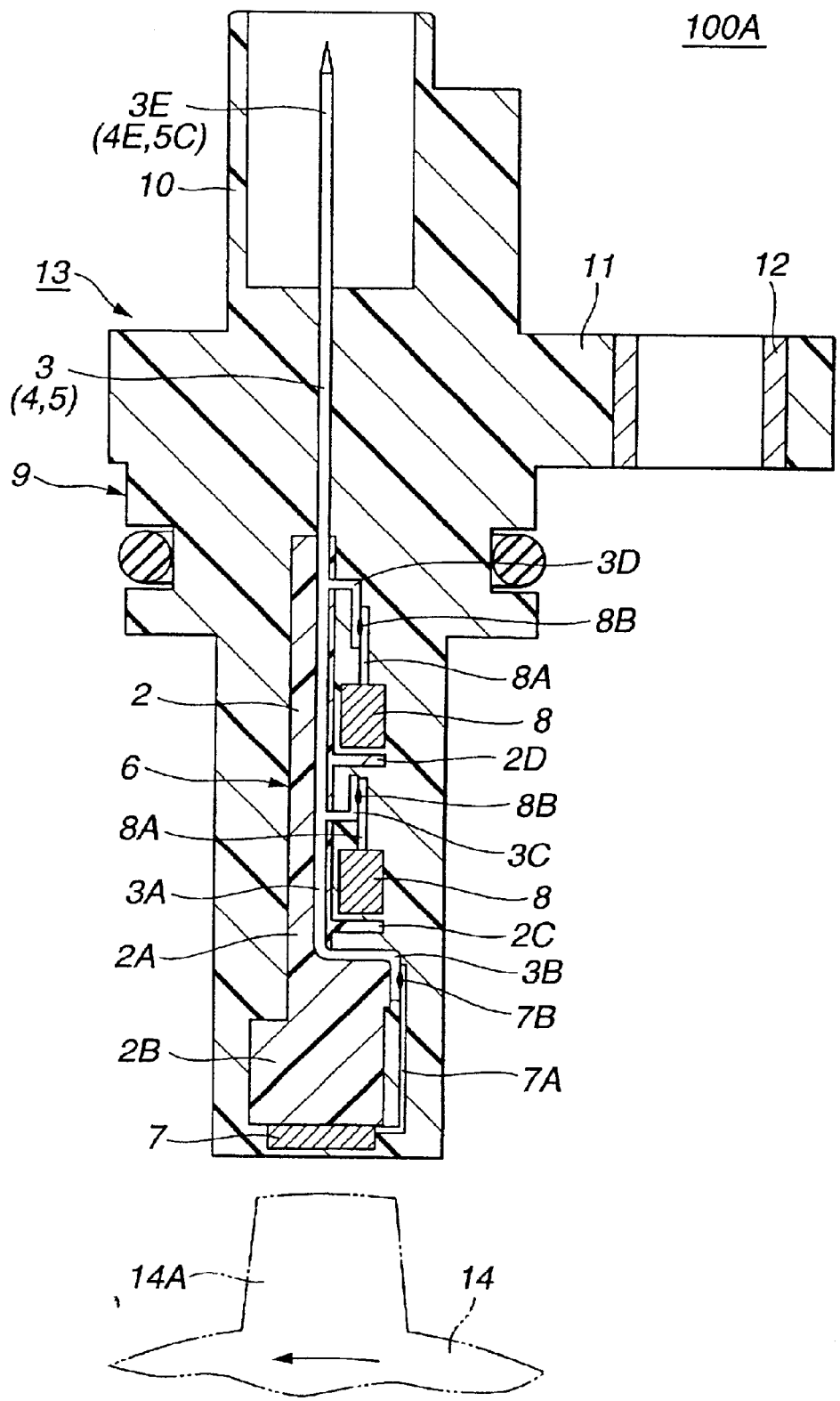
FIG. 2 is a sectional view taken along the line II—II of FIG. 1.

Referring to FIGS. 1 to 7, particularly FIGS. 1 and 2, there is shown a rotation detecting device 100A of a first embodiment of the present invention.

The rotation detecting device 100A herein shown is a speed detector that detects a rotation speed of an automotive engine.

In order to facilitate the explanation of the rotation detecting device 100A of the first embodiment, it will be commenced with respect to essential parts of the device 100A.

Figure 5:
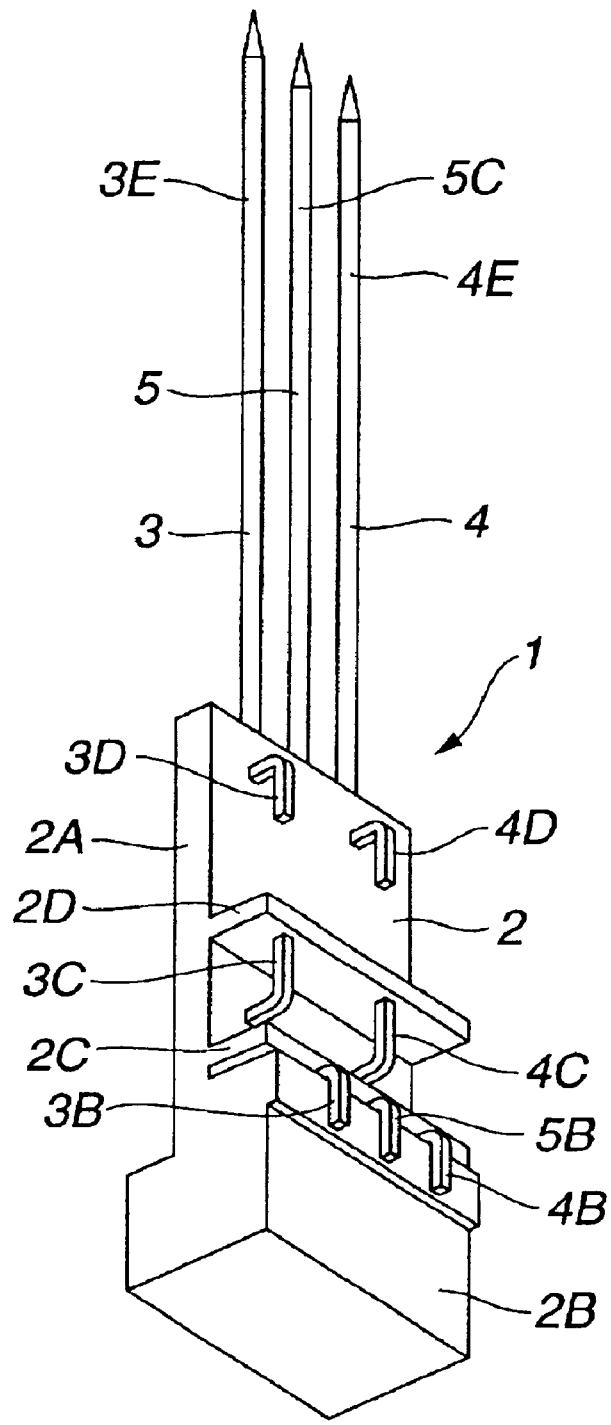
FIG. 5 is a perspective view of the parts-holder just molded by the first mold assembly.

In FIG. 5, there is shown a parts-holder 1 that constitutes a base portion of rotation detecting device 100A. As shown, parts-holder 1 comprises generally a molded plastic base 2 and three parallel terminal pins 3, 4 and 5 having lower portions embedded in base 2. As shown, plastic base 2 has a rectangular shape that extends in the same direction as terminal pins 3, 4 and 5. The rectangular plastic base 2 comprises a thinner plate portion 2A, a thicker body portion 2B formed on a lower end of thinner plate portion 2A, and first and second wall portions 2C and 2D formed on or raised from one surface of thinner plate portion 2A.

The terminal pins 3, 4 and 5 are constructed of highly conductive metal. As is seen from FIG. 2, upon assembly, these terminal pins 3, 4 and 5 extend from a sensor element 7 to a connector part 10 of a housing 9.

Figure 3:
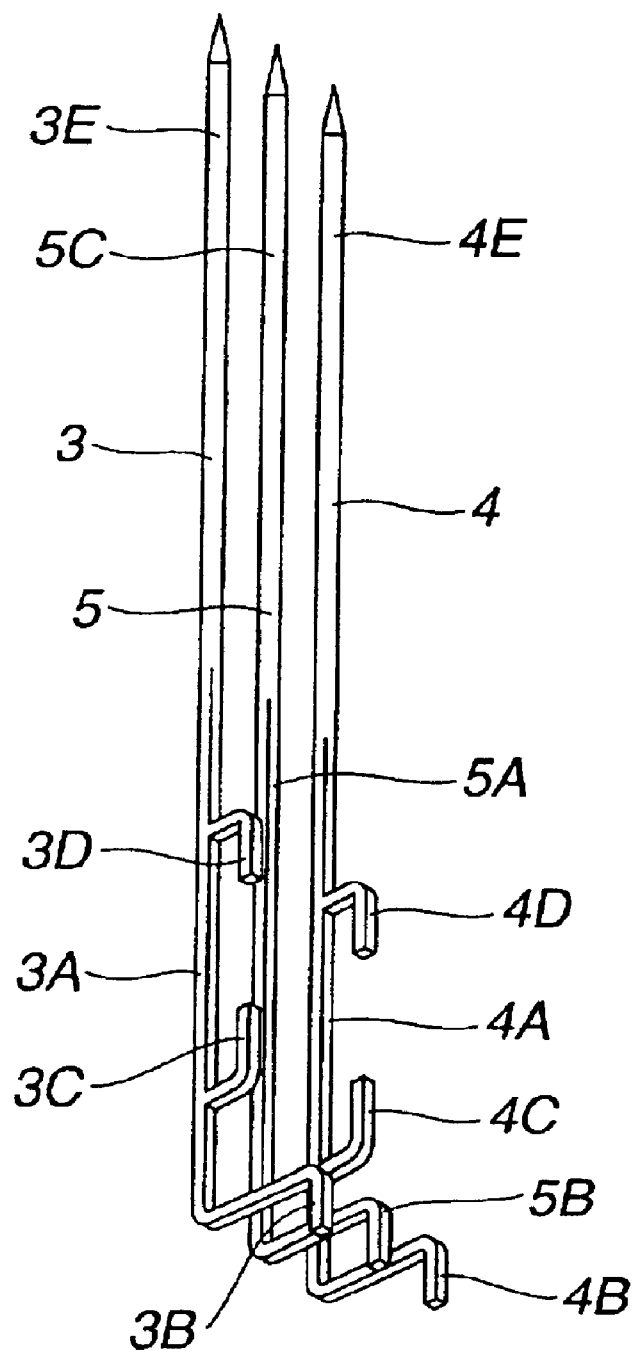
FIG. 3 is a perspective view of terminal pins.

As is seen from FIG. 3, left and right terminal pins 3 and 4 are the same in construction. Each pin 3 or 4 has a lower portion 3A or 4A that is to be embedded in rectangular plastic base 2. Lower portion 3A or 4A of pin 3 or 4 comprises first, second and third L-shaped projections 3B or 4B, 3C or 4C and 3D or 4D which project in the same direction. The first projection 3B or 4B is provided at a lower end of terminal pin 3 or 4, as shown. A terminal upper end of pin 3 or 4 is designated by 3E or 4E.

While, center terminal pin 5 has a lower portion 5A that is embedded in rectangular plastic base 2. The lower portion 5A has an L-shaped projection 5B at a lower end of pin 5, which will be referred to as a first L-shaped projection 5B for convenience. That is, center terminal pin 5 has no projections corresponding to second and third projections 3C and 3D or 4C and 4D of left and right terminal pins 3 and 4. A terminal upper end of pin 5 is denoted by 5C.

As is seen from FIG. 5, upon parts-holder 1 being molded, leading ends of first L-shaped projections 3B, 4B and 5B of left, right and center pins 3, 4 and 5, those of second L-shaped projections 3C and 4C of left and right pins 3 and 4 and those of third L-shaped projections 3D and 4D of left and right pins 3 and 4 are exposed to the outside from thinner plate portion 2A of rectangular plastic base 2. As shown, the exposed leading ends of third L-shaped projections 3D and 4D and those of second L-shaped projections 3C and 4C are separated by second wall portion 2D, and the exposed leading ends of second L-shaped projections 3C and 4C and those of first L-shaped projections 3B, 4B and 5B are separated by first wall portion 2C.

Figure 6:
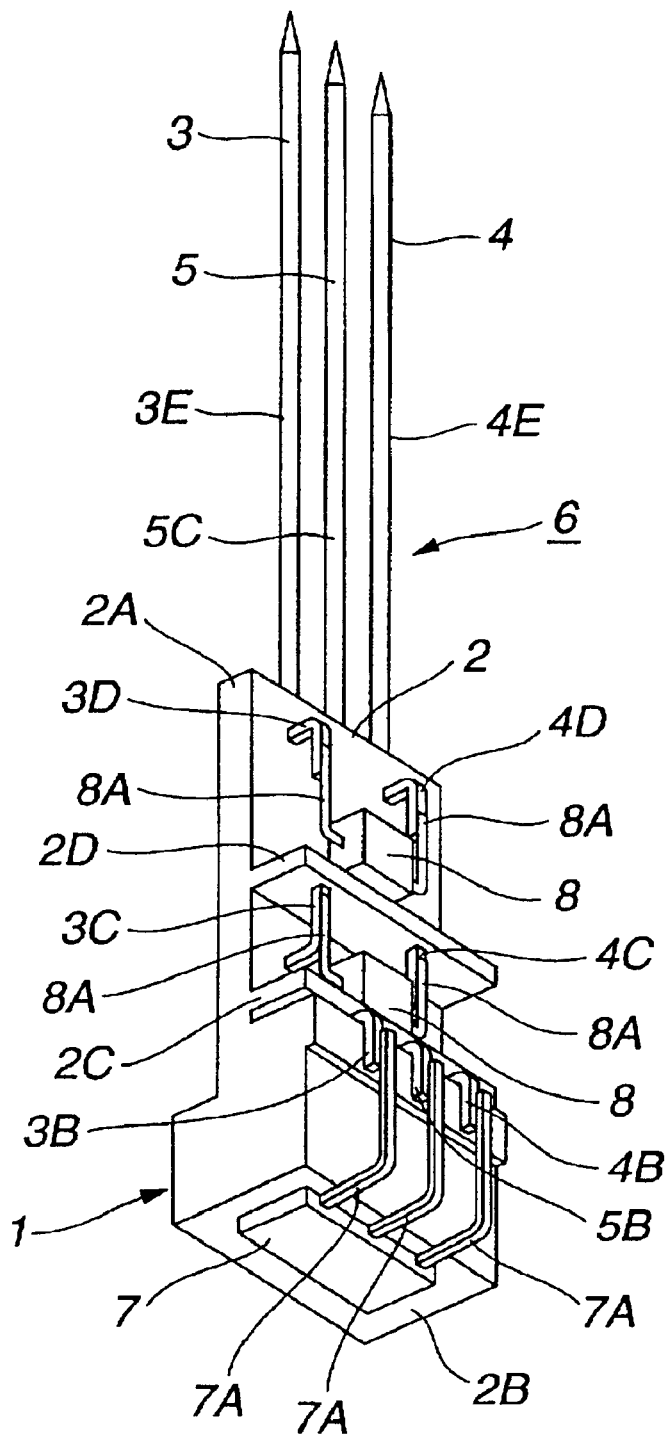
FIG. 6 is a perspective view of an intermediate assembly, viz., the parts-holder with various electronic elements mounted thereon through soldering.

As is seen from in FIG. 6, various electronic elements are mounted to parts-holder 1 to constitute an intermediate assembly 6. That is, a sensor element 7 and electronic elements 8 are mounted to parts-holder 1. The sensor element 7 comprises a magnetic resistance element or Hall element, which is constructed to sense a change of magnetic field. As shown, from sensor element 7, there extend three terminals 7A which are soldered to the exposed leading ends of first L-shaped projections 3B, 4B and 5B respectively. Spot welding may be used for this connection. The soldered portion between terminal 7A and first L-shaped projection 3B is denoted by reference 7B in FIG. 2.

As is seen from FIG. 2, when in use, the rotation detecting device 100A is located near a certain gear 14 of an associated engine, whose rotation speed is to be detected. More specifically, gear 14 is rotated with an output shaft of the engine, and the device 100A is arranged so that sensor element 7 faces teeth 14A of gear 14 to detect the number of teeth 14A passing per unit time. That is, sensor element 7 produces information signals in accordance with rotation speed of gear 14. The information signals are fed to a control unit (not shown) for controlling operation of the engine.

Referring back to FIG. 6, each of electronic elements 8 constitutes a signal processing circuit for processing the signals from sensor element 7. The circuit generally comprises resistors, condensers, transistors and the like. Of course, IC tips may be used for the circuit. In the signal processing circuit, various processes, such as signal amplification process, wave shaving process, noise reduction process and the like are carried out.

As shown in FIG. 6, upper electronic element 8 has two terminals 8A respectively soldered to the exposed leading ends of third L-shaped projections 3D and 4D of left and right terminal pins 3 and 4. While, lower electronic element 8 has two terminals 8A respectively soldered to the exposed leading ends of second L-shaped projections 3C and 4C of left and right terminal pins 3 and 4. In FIG. 2, the soldered portion between second L-shaped projection 3C and terminal 8A is denoted by reference 8B. With this soldering, the two electronic elements 8 are stably mounted on thinner plate portion 2A of plastic base 2.

Referring back to FIG. 2, there is shown the entire construction of rotation detecting device 100A which has intermediate assembly 6 (see FIG. 6) installed therein. That is, intermediate assembly 6 is intimately installed in an insulated plastic housing 9. As will be described in detail hereinafter, for producing rotation detecting device 100A, integral molding technique is employed using intermediate assembly 6 as an insert. As shown, intermediate assembly 6 is substantially embedded in a solid structure of plastic housing 9 except upper portions 3E, 4E and 5C of left, right and center terminal pins 3, 4 and 5.

As is best shown in FIG. 2, an upper part of rotation detecting device 100A is formed with a recess (no numeral) into which upper portions 3E, 4E and 5C of the three terminals 3, 4 and 5 are exposed. Thus, the upper part of the device 100A constitutes a connector part 10, more specifically, a female part of a connector assembly. When a male part (not shown) of the connector assembly is received in the female part 10, an electric connection therebetween is established. The male part is connected to the control unit through a cable.

The housing 9 is formed with a flange 11 that is to be connected to the engine through bolts. For passing the bolts, flange 11 is formed with bores reinforced by metal sleeves 12. As will be described hereinafter, these metal sleeves 12 are set in given positions in a mold assembly as inserts before carrying out an integral molding.

In the following, operation of rotation detecting device 100A will be briefly described with reference to FIG. 2.

When gear 14 is rotated in the direction of the arrow, sensor element 7 detects successive changes in magnetic field detecting the number of teeth 14A passing per unit time. Information signals thus produced by sensor element 7 are led to electronic elements 8 through three terminal pins 3, 4 and 5 to be processed and led to the control unit (not shown) through the male part of the connector fitted in the connector part 10 and the cable. By processing the information signals, the control unit calculates the rotation speed of engine.

In the following, method of producing rotation detecting device 100A will be described with reference to FIGS. 3 to 7.

As will become apparent as the description proceeds, in this method, two molding steps are employed for producing rotation detecting device 100A.

First, terminal pins 3, 4 and 5 as shown in FIG. 3 are prepared. Press working or punching is employed for producing such pins 3, 4 and 5 from a metal sheet.

Figure 4:
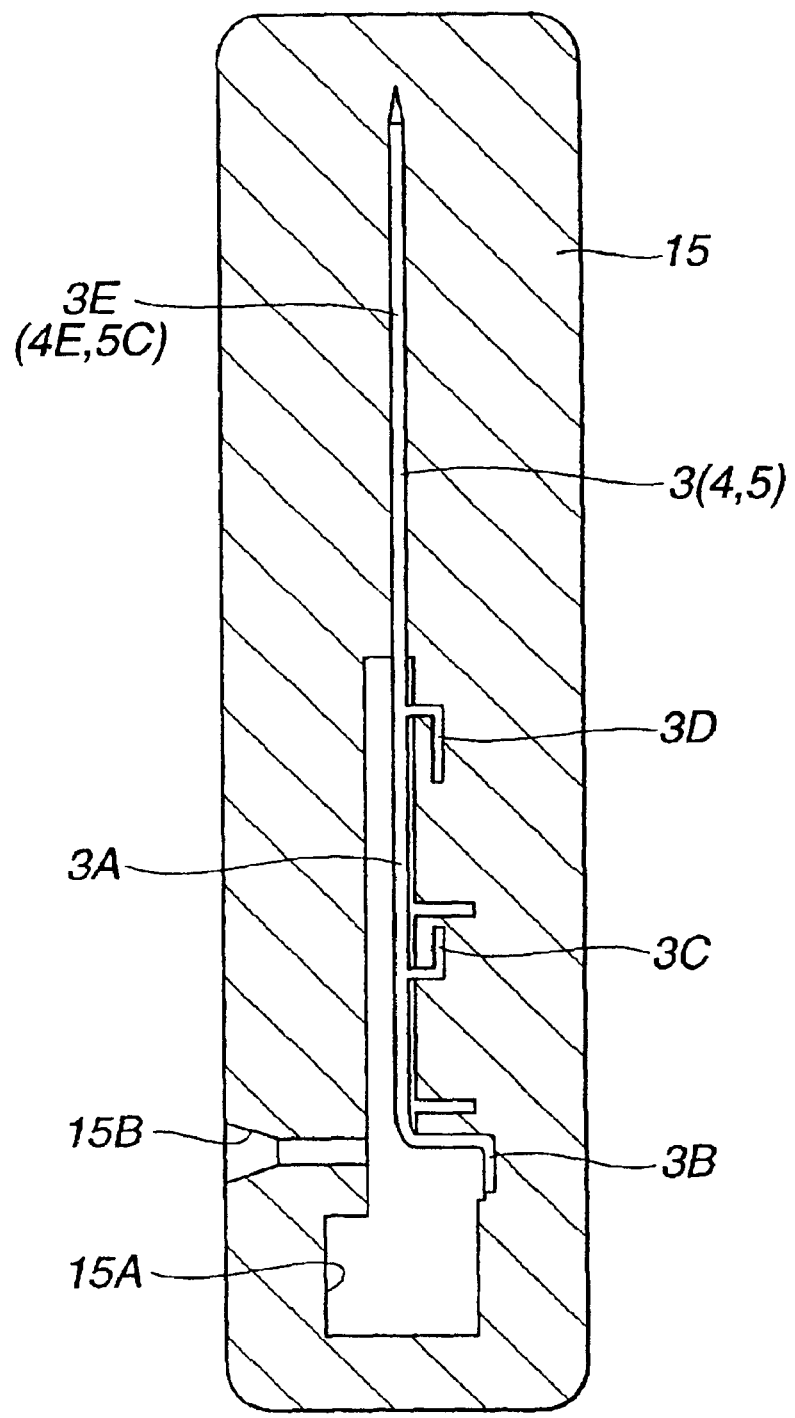
FIG. 4 is a sectional view of a first mold assembly for molding a parts-holder by using the terminal pins as inserts.

Then, as is seen from FIG. 4, the three terminal pins 3, 4 and 5 are properly set in a first mold assembly 15. As shown, when assuming a closed condition, first mold assembly 15 defines a cavity 15A of a shape corresponding to the shape of plastic base 2 (see FIG. 5) of parts-holder 1. Then, a molten plastic material is injected into cavity 15A from an inlet opening 15B. Once the plastic material is cured to have a certain hardness, first mold assembly 15 is opened to release a product. With this, parts-holder 1 as shown in FIG. 5 is produced.

Then, as is seen from FIG. 6, sensor element 7 and electronic elements 8 are soldered to terminal pins 3, 4 and 5 in the above-mentioned manner to constitute the intermediate assembly 6.

Figure 7:
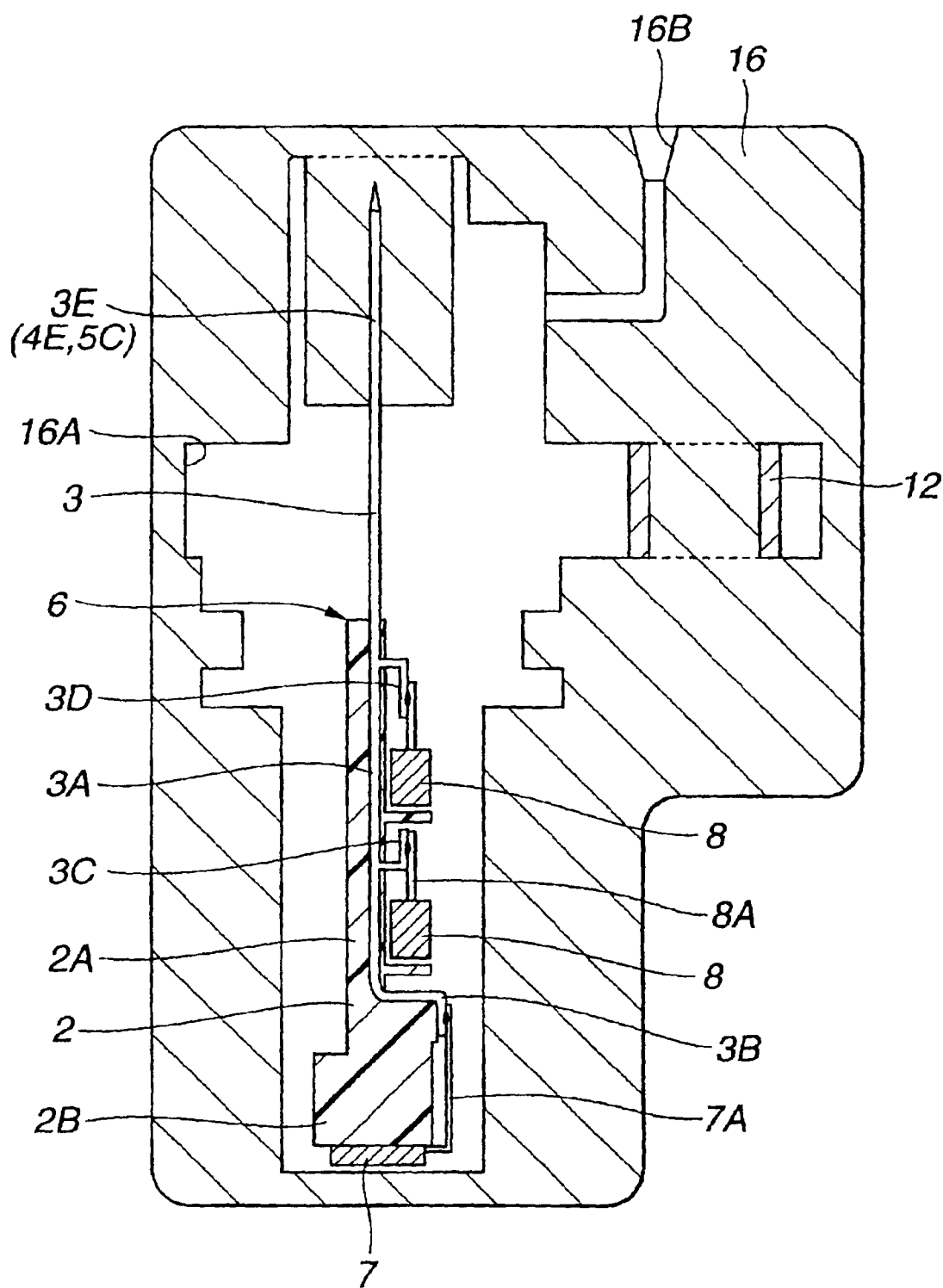
FIG. 7 is a sectional view of a second mold assembly for molding a housing of the rotation detecting device of the first embodiment by using the intermediate assembly as an insert.

Then, as is seen from FIG. 7, intermediate assembly 6 and metal sleeves 12 are properly set in a second mold assembly 16. As shown, when assuming a closed condition, second mold assembly 16 defines a generally cylindrical cavity 16A of a shape corresponding to the shape of housing 9 (see FIG. 2) of rotation detecting device 100A. Then a molten plastic material is injected into cavity 16A from an inlet opening 16B of second mold assembly 16. Once the plastic material is cured to have a certain hardness, second mold assembly 16 is opened to release a product. With this, rotation detecting device 100A as shown in FIG. 2 is produced.

In the following, advantages of the above-mentioned first embodiment 100A will be described.

For producing the rotation detecting device 100A, two injection molding processes are employed, one being for producing parts-holder 1 and the other being for producing the finished product, viz., the device 100A. As is understood from the above description, connecting sensor element 7 and electronic elements 8 to parts-holder 1 is made by only using a common soldering technique. Because parts-holder 1 is entirely exposed to the outside, such soldering process is easily and assuredly carried out.

Furthermore, in the process of producing the finished product, intermediate assembly 6 serves as an insert of the integral molding. Thus, the finished produce, viz., the rotation detecting device 100A possesses a satisfied dimensional stability.

Since the essential elements, viz., sensor element 7 and electronic elements 8 of the rotation detecting device 100A are hermetically embedded in housing 9, reliability of the device 100A is increased.

The connector part 10 is simultaneously formed upon molding of housing 9 of device 100A. This brings about shortened production step, compact structure and low cost production of the device 100A.

The left, right and center terminal pins 3, 4 and 5 serve as parts-holder elements besides their fundamental role (viz., elements of connector part 10), which brings about reduction in number of essential parts used for the device 10A.

Figure 8:
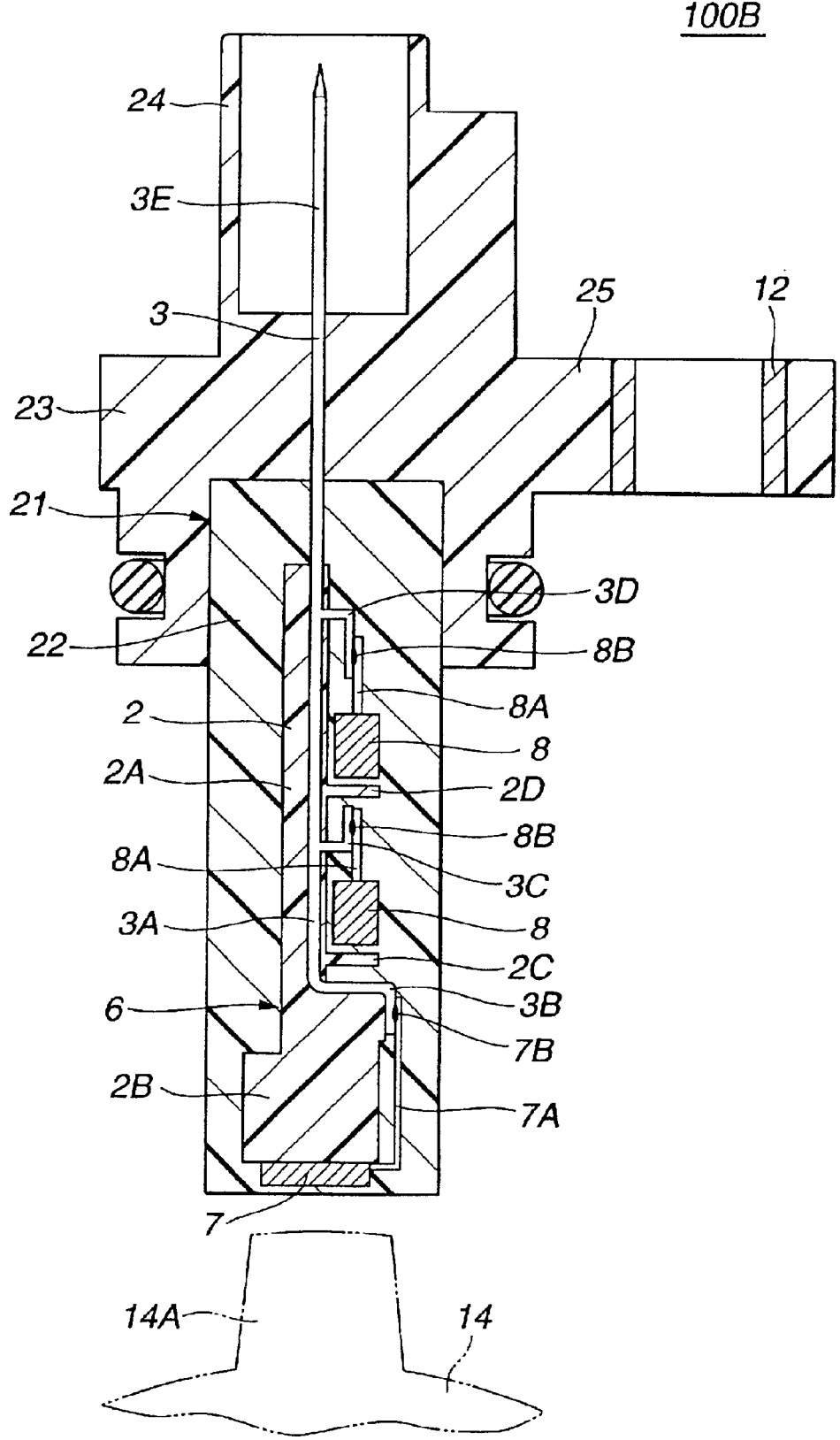
FIG. 8 is a sectional view of a rotation detecting device of a second embodiment of the present invention.

Referring to FIGS. 8 to 11, particularly FIG. 8, there is shown a rotation detecting device 100B of a second embodiment of the present invention, which is a speed detector for detecting a rotation speed of an automotive engine.

In the drawings of the second embodiment 100B, parts and elements denoted by the same numerals as those of the above-mentioned first embodiment 100A are the same as those in the first embodiment 100A.

As will become apparent from the following description, in this second embodiment 100B, three, viz., first, second and third molding steps are employed for producing rotation detecting device 100B.

That is, as is understood when comparing FIG. 8 of the second embodiment 100B with FIG. 2 of the first embodiment 100A, the housing of the device 100B comprises two parts which are produced through respective, viz., second and third molding steps.

In the following, method of producing rotation detecting device 100B will be described with the aid of the drawings.

First, like in case of the first embodiment, three terminal pins 3, 4 and 5 are set in a first mold assembly and subjected to an injection molding to produce a parts-holder 1.

Then, like in the first embodiment, sensor element 7 and electronic elements 8 are connected or soldered to the parts-holder 1 to produce a first intermediate assembly 6.

Figure 9:
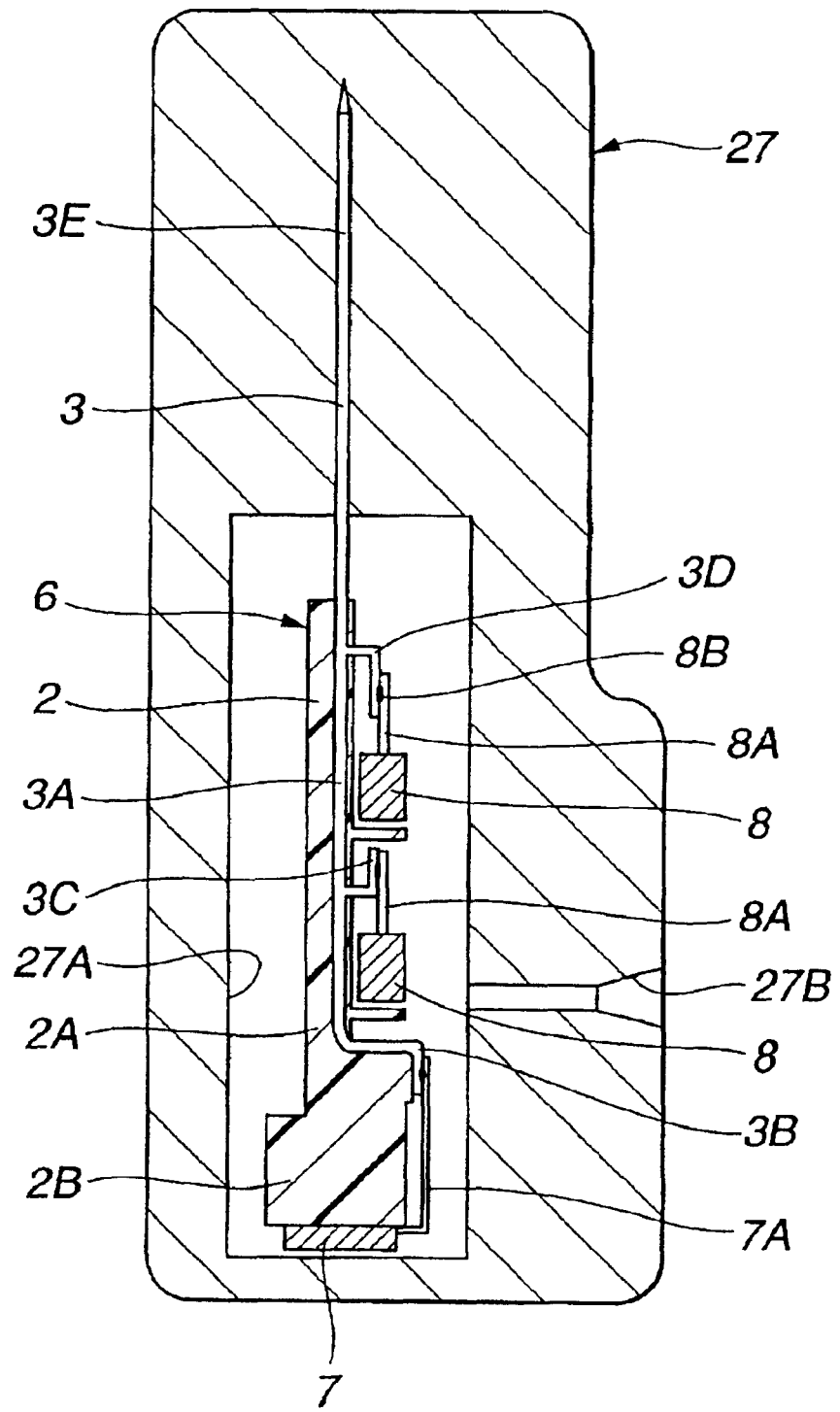
FIG. 9 is a sectional view of a second mold assembly for molding a second intermediate assembly used in the second embodiment.
Figure 10:
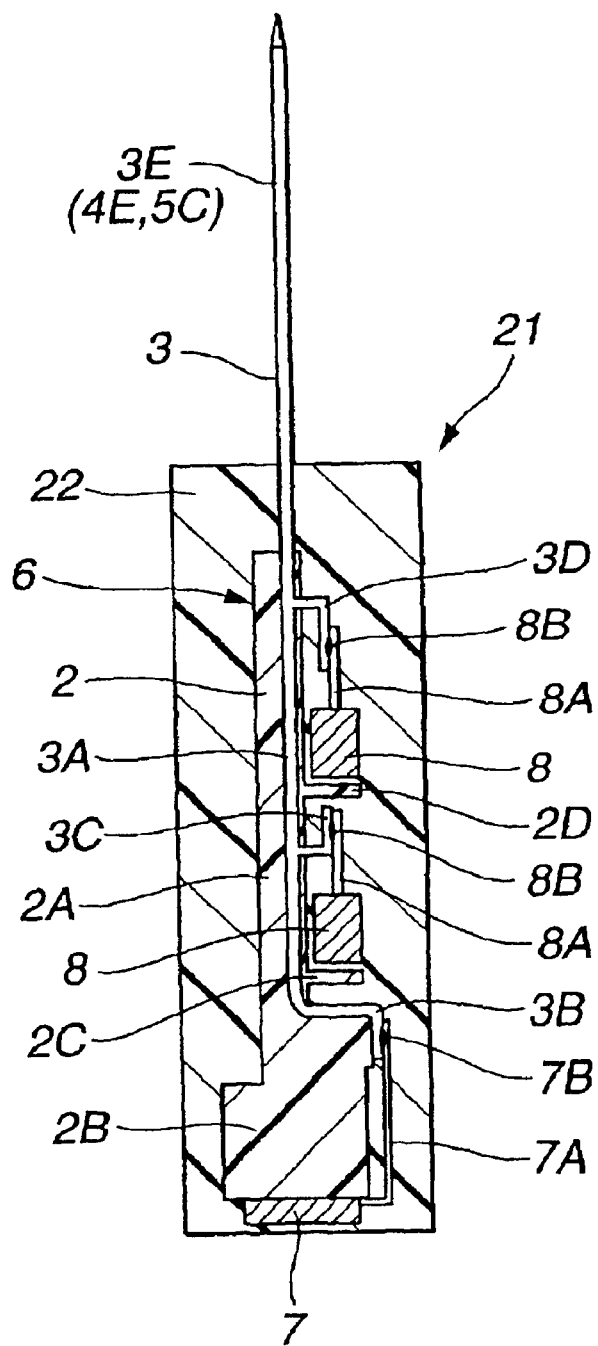
FIG. 10 is a sectional view of the second intermediate assembly just molded by the second mold assembly of FIG. 9.

Then, as is seen from FIG. 9, first intermediate assembly 6 is properly set in a second mold assembly 27. As shown, when assuming a closed condition, second mold assembly 27 defines a cylindrical cavity 27A that entirely covers a lower portion of first intermediate assembly 6. Then, a molten plastic material is injected into cavity 27A from an inlet opening 27B. Once the plastic material is cured to have a certain hardness, second mold assembly 27 is opened to release a product, viz., a second intermediate assembly 21 shown in FIG. 10. As shown, by this molding, a sensor side housing part 22 is produced, which intimately embeds therein first intermediate assembly 6.

Figure 11:
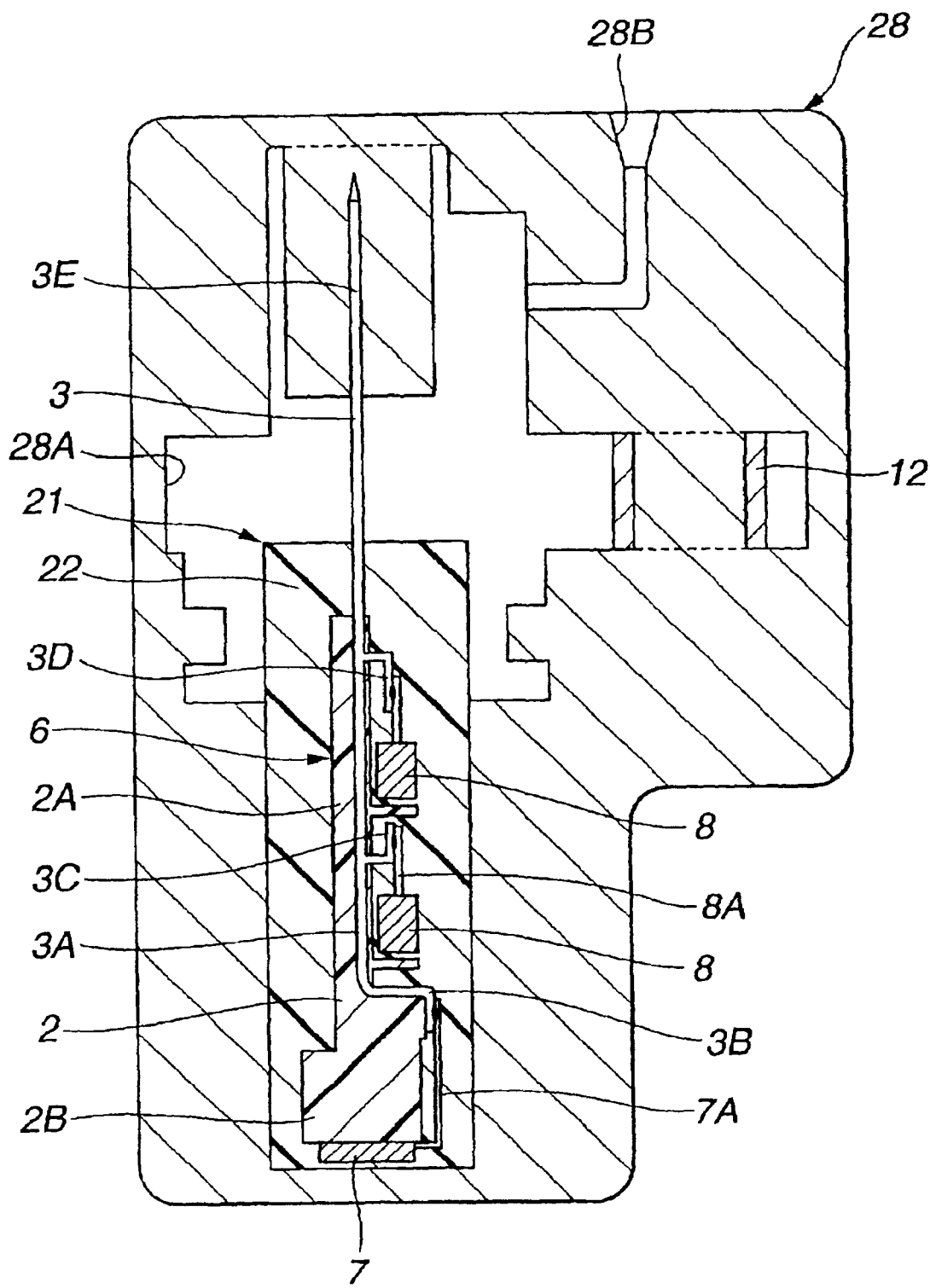
FIG. 11 is a sectional view of a third mold assembly for molding a housing of the rotation detecting device of the second embodiment by using the second intermediate assembly of FIG. 10 as an insert.
Figure 12:
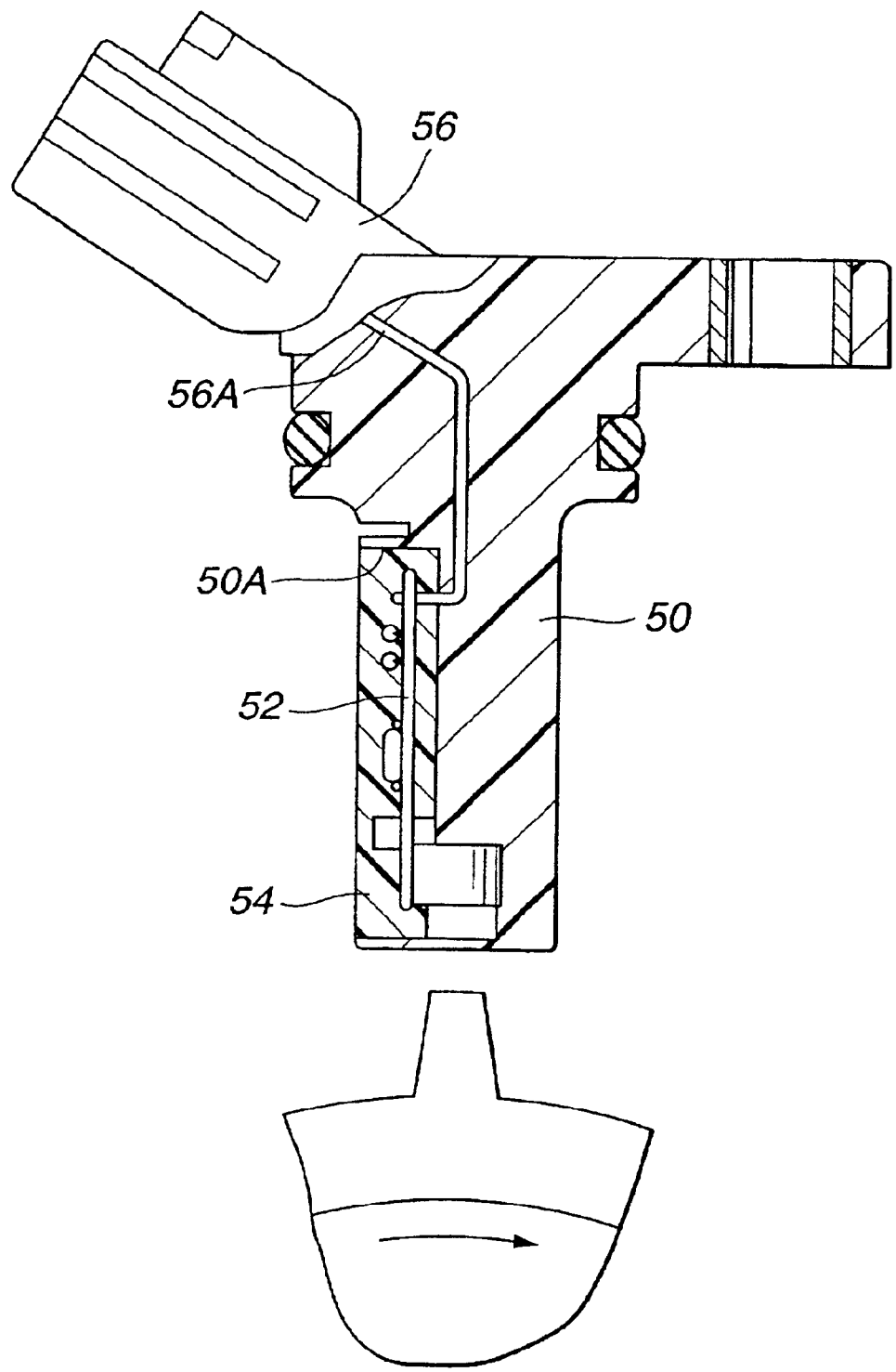
FIG. 12 is a sectional view of a rotation detecting device of a related art.
Figure 13:
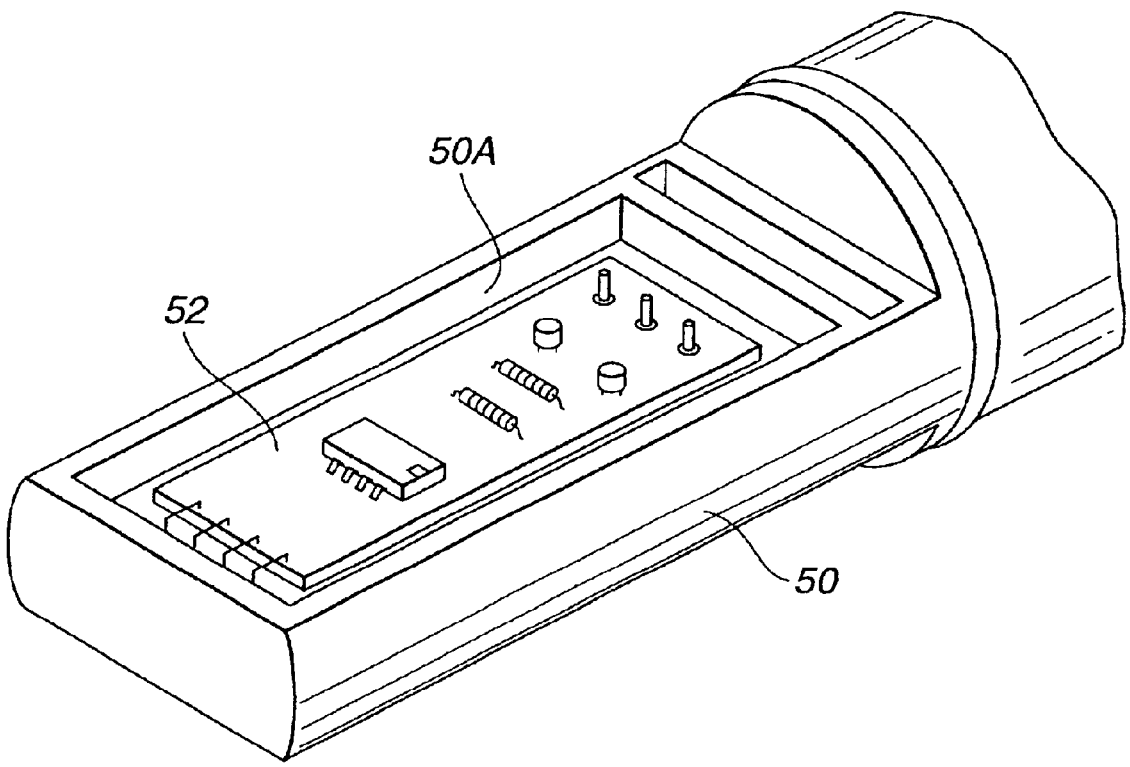
FIG. 13 is a perspective view of a part of the rotation detecting device of the related art.

Then, as is seen from FIG. 11, second intermediate assembly 21 and metal sleeves 12 are properly put in a third mold assembly 28. As shown, when assuming a closed condition, third mold assembly 28 defines a cavity 28A that covers an upper portion of second intermediate assembly 21 set therein. Then, a molten plastic material is injected into cavity 28A from an inlet opening 28B of third mold assembly 28. Once the plastic material is cured to have a certain hardness, the third mold assembly 28 is opened to release a product, viz., a rotation detecting device 100B as shown in FIG. 8. As shown in this drawing, by this molding, a connector side housing part 23 is produced, which intimately covers an upper portion of sensor side housing part 22 and has a connector part 24 and a flange 25.

In rotation detecting device 100B of the second embodiment, substantially same advantages as those of first embodiment 100A are obtained because of similarity therebetween in construction. In addition to this, in the second embodiment 100B, various types of rotation detecting devices can be easily produced by only changing the third mold assembly 28.

The entire contents of Japanese Patent Application 2001-163413 filed May 30, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A rotation detecting device comprising:
   an intermediate assembly having a dimension in a longitudinal direction, said assembly including:
      terminal pins each having first and second portions integrally formed and extending in said longitudinal direction, each first portion having at least one projection therefrom and each second portion comprising a leading end;
      a molded plastic base in which a substantial part of said first portions of the terminal pins are embedded with said projections being exposed to the outside; and
      a plurality of electronic elements directly connected to the exposed projections of said portions of said terminal pins, one of said electronic elements being a sensor element which is mounted on said molded plastic base; and
   a molded plastic housing entirely and hermetically covering said intermediate assembly except a connector part thereof where said leading ends of said second portions of said terminal pins are positioned.

2. A rotation detecting device as claimed in claim 1, in which said connector part comprises a recess formed in said molded plastic housing, to which the leading ends of said terminal pins are exposed.

3. A rotation detecting device as claimed in claim 1, in which the projections of the first portions of said terminal pins have each a generally L-shape.

4. A rotation detecting device as claimed in claim 1, in which said molded plastic housing is formed with a flange, said flange having at least one bore reinforced with a metal sleeve.

5. A rotation detecting device as claimed in claim 1, in which the electronic elements are connected to the exposed projections of said terminal pins through soldering.

6. A rotation detecting device as claimed in claim 1, in which said molded plastic housing comprises:
   a sensor side housing part which entirely and intimately embeds therein said first and second portions of said terminal pins, said projections of said terminal pins, said molded plastic base and said electronic elements; and
   a connector side housing part which intimately covers one portion of said sensor side housing part and defines said connector part.

7. A rotation detecting device as claimed in claim 6, in which said connector side housing is formed with a flange, said flange having a bore reinforced with a metal sleeve.

8. A rotation detecting device comprising:
   an intermediate assembly including terminal pins having given portions, each given portion having at least one projection; a molded plastic base in which said given portions of the terminal pins are embedded with said projections being exposed to the outside; and a plurality of electronic elements connected to the exposed projections of said given portions of said terminal pins, one of said electronic elements being a sensor element which is mounted on said molded plastic base; and
   a molded plastic housing entirely and hermetically covering said intermediate assembly except a connector part thereof where leading ends of said terminal pins are positioned,
   wherein said molded plastic base of said intermediate assembly comprises:
      a thinner plate portion from which the projections of said terminal pins are exposed to the outside;
      a thicker body portion formed on one end of said thinner plate portion, said sensor element being mounted on said thicker body portion; and
      spaced wall portions formed on one surface of said thinner plate portion to separate positions where said electronic elements are located.

9. A method of producing a rotation detecting device, comprising:
   (a) setting a plurality of terminal pins in a first mold assembly, said terminal pins having projections;
   (b) injecting a molten plastic material into said first mold assembly to produce a parts-holder, said parts-holder including a molded plastic base in which given portions of said terminal pins are embedded with said projections being exposed to the outside;
   (c) connecting electronic elements directly to the exposed projections of the terminal pins thereby to constitute an intermediate assembly; and
   (d) molding a housing that hermetically embeds therein said intermediate assembly except leading ends of said terminal pins and has a recess of a connector part to which the leading ends of said terminal pins are exposed.

10. A method as claimed in claim 9, in which the step (d) comprises:

(e) setting said intermediate assembly in a second mold assembly; and (f) injecting a molten plastic material into said second mold assembly to mold said housing.

11. A method as claimed in claim 9, in which the step (d) comprises:

(e) setting said intermediate assembly in a second mold assembly;

(f) injecting a molten plastic material into said second mold assembly to mold a first part of said housing thereby to produce another intermediate assembly, said first part hermetically covering said intermediate assembly except leading portions of said terminal pins;

(g) setting said another intermediate assembly in a third mold assembly; and (h) injecting a molten plastic material into said third mold assembly to mold a second part of said housing, said second part hermetically covering a portion of said another intermediate assembly and having the recess of connector part to which the leading ends of said terminal pins are exposed.

12. A method as claimed in claim 9, in which the step (c) is achieved by one of soldering technique and welding technique.

13. A method of producing a rotation detecting device, comprising:

(a) setting a plurality of terminal pins in a first mold assembly, said terminal pins having projections;

(b) injecting a molten plastic material into said first mold assembly to produce a parts-holder, said parts-holder including a molded plastic base in which given portions of said terminal pins are embedded with said projections being exposed to the outside;

(c) connecting electronic elements to the exposed projections of the terminal pins thereby to constitute an intermediate assembly, the connecting being achieved by one of soldering technique and welding technique;

(d) setting said intermediate assembly in a second mold assembly; and (e) injecting a molten plastic material into said second mold assembly to mold a housing that hermetically embeds therein said intermediate assembly except leading ends of said terminal pins and has a recess of a connector part to which the leading ends of said terminal pins are exposed.

14. A method of producing a rotation detecting device, comprising:

(a) setting a plurality of terminal pins in a first mold assembly, said terminal pins having projections;

(b) injecting a molten plastic material into said first mold assembly to produce a parts-holder, said parts-holder including a molded plastic base in which given portions of said terminal pins are embedded with said projections being exposed to the outside;

(c) connecting electronic elements to the exposed projections of the terminal pins thereby to constitute a first intermediate assembly, the connecting being achieved by one of soldering technique and welding technique;

(d) setting said first intermediate assembly in a second mold assembly;

(e) injecting a molten plastic material into said second mold assembly to mold a first housing part that hermetically embeds therein said first intermediate assembly except leading portions of said terminal pins, thereby to produce a second intermediate assembly;

(f) setting said second intermediate assembly in a third mold assembly; and (g) injecting a molten plastic material into said third mold assembly to mold a second housing part that hermetically covers one portion of said second intermediate assembly and has a recess of a connector part to which leading ends of said terminal pins are exposed.

* * * * *